(12) United States Patent
Albers et al.

(10) Patent No.: US 10,642,238 B2
(45) Date of Patent: May 5, 2020

(54) MODULE FOR A TECHNICAL INSTALLATION AND SYSTEM AND METHOD FOR CARRYING OUT A TECHNICAL PROCESS

(71) Applicant: WAGO Verwaltungsgesellschaft mbH, Minden (DE)

(72) Inventors: Thomas Albers, Minden (DE); Thomas Holm, Stadthagen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 95 days.

(21) Appl. No.: 16/072,201

(22) PCT Filed: Jan. 25, 2017

(86) PCT No.: PCT/EP2017/051518
§ 371 (c)(1),
(2) Date: Jul. 24, 2018

(87) PCT Pub. No.: WO2017/129604
PCT Pub. Date: Aug. 3, 2017

(65) Prior Publication Data
US 2019/0025785 A1    Jan. 24, 2019

(30) Foreign Application Priority Data

Jan. 26, 2016  (DE) .................... 10 2016 201 075

(51) Int. Cl.
*G05B 19/042*  (2006.01)
*G05B 19/418*  (2006.01)
*H04L 29/08*   (2006.01)

(52) U.S. Cl.
CPC ....... *G05B 19/042* (2013.01); *G05B 19/4188* (2013.01); *H04L 67/025* (2013.01);
(Continued)

(58) Field of Classification Search
USPC .......................................................... 700/9
See application file for complete search history.

(56) References Cited

U.S. PATENT DOCUMENTS

2010/0292810 A1  11/2010  Colombo et al.
2013/0212420 A1*  8/2013  Lawson ............. G05B 19/4185
                                                  713/400

FOREIGN PATENT DOCUMENTS

WO    2009/053472 A1    4/2009

OTHER PUBLICATIONS

"DIMA Dezentrale Intelligenz fuer nnodulare Anlagen," (Dec. 31, 2015), 8 pages, XP055355896, Retrieved from the Internet by the EPO on Mar. 17, 2017. Attached Copy from Related U.S. Appl. No. 16/072,925. Machine Translation by Google translate. (Year: 2015).*

(Continued)

*Primary Examiner* — Mohammad Ali
*Assistant Examiner* — Joshua T Sanders
(74) *Attorney, Agent, or Firm* — Renner, Otto, Boisselle & Sklar, LLP (57) ABSTRACT

Module 1 for a technical facility 90 comprising a technical hardware 10 for the execution of a technical sub-process, a control 20 for a local control of the technical hardware 10, wherein the control 20 is adapted to control the technical hardware 10 autarkical, and an external interface 22 of the control 20, wherein the external interface 22 comprises an administration shell 23, wherein the administration shell 23 publishes at least one service relating to an output product 140 of the module 1 via a network 62, and wherein the external interface 22 is adapted to request at least one service relating to an input product 130 of the module 1 via the network 62. Furthermore, a corresponding system for the execution of a process by means of a technical facility 90 as well as a corresponding method for the execution of a (Continued)

technical process by means of a technical facility 90 is claimed.

17 Claims, 4 Drawing Sheets

(52) U.S. Cl.
CPC .... *H04L 67/16* (2013.01); *G05B 2219/31196* (2013.01); *Y02P 90/18* (2015.11); *Y02P 90/24* (2015.11); *Y02P 90/265* (2015.11)

(56) References Cited

OTHER PUBLICATIONS

"DIMA," Mar. 20, 2017 (Mar. 20, 2017), pp. 1-2, XP055356602, Retrieved from the Internet: URL:http://www.dima-process.com/ [retrieved on Mar. 20, 2017] the whole document.

* cited by examiner

MODULE FOR A TECHNICAL INSTALLATION AND SYSTEM AND METHOD FOR CARRYING OUT A TECHNICAL PROCESS

RELATED APPLICATIONS

The present invention is a National Phase application of International Application No. PCT/EP2017/051518 filed on Jan. 25, 2017, which claims the priority of German Patent Application DE 10 2016 201 075.1 filed on Jan. 26, 2016, the disclosures of which are incorporated herein by reference.

1. Field Of The Invention

The present invention relates to technical facilities and their control. In particular, the present invention relates to modular structured process and production-related facilities as well as a system and a method for the execution of a technical process.

2. Prior Art

In the process industry, in particular in chemistry, pharmacy and food production, the demanded product quantities are increasingly more difficult to predict and fluctuate dependent of the region in short time intervals. Furthermore, the product life cycles shorten overall constantly due to the global availability of alternatives.

Common production facilities are often, however, not designed for these fluctuating product quantities. Continuously-operating facilities are usually optimized to a certain product quantity per time unit and are only operable effectively by this production rate. Common facilities for a batch-operation are less efficient and require a lot of unproductive times, for example cleaning times or process changeover times.

In case of an extension or changeover of the facility it is in general necessary to reconfigure or reprogram the corresponding control of the facility as well. This is an elaborate process that can be compared in times often with the hardware changeover. This becomes even more difficult by a potentially insufficient documentation of the existing control software or outdated control hardware that potentially does not provide sufficiently the required functions for the new hardware.

New developments in the process industry relate to modular facility concepts in which the facility is assembled from ready-made modules. Such concepts and their challenges are described in a survey "*modular facility conceptual design and automation by means of the $F^3$ project*" ("*Modulare Anlagenkonzeption und Automatisierung mithilfe des $F^3$-Projekts*") by Dipl.-Ing. Sabine Mühlenkamp/Wolfgang Ernhofer, May 10, 2012, in "*Process*". Herein the control-related integration of the modules is regarded as a still open question as well.

Corresponding modular concepts are also portable to other production processes, e.g. for the production of consumer goods, industrial products etc.

In such modular concepts, each facility module provides its process-related or production-related function as a service to a higher-ranking process management level (PFE). Thereby it takes the position of a service provider. The service offered by the facility module can be called by the process management level which is then a user of the service. The integration of several facility modules and their services to a total to facility by a facility designer is called PFE-engineering.

Thus, for the present invention arises the problem to provide modules of a technical facility that improve the PFE-engineering as well as to provide a system and a method that improve the execution of a technical process.

3. SUMMARY OF THE INVENTION

The problem above is solved by a module for a technical facility according to claim 1, by a system for the execution of a technical process according to claim 11 as well as by a method for the execution of a technical process by means of a technical facility according to claim 17.

In particular the problem above is solved by a module for a technical facility comprising a technical hardware for the execution of a technical sub-process, a control for a local control of the technical hardware, wherein the control is adapted to control the technical hardware autarkical, and an external interface of the control, wherein the external interface comprises an administration shell, wherein the administration shell publishes at least one service relating to an output product of the module via a network, and wherein the external interface is adapted to request at least one service relating to an input product of the module via the network.

A technical facility can be assembled from several of such modules. In case more production capacity is desired modules can be switched to the facility in an easy manner and execute certain sub-processes. Because the control of the respective. module controls the technical hardware locally and autarkical and can bring it for example without control from the outside into certain defined states, the control effort of the total facility in minimized. Thus, the control of the module can be provided, programmed and configured already by the module manufacturer such that the facility manufacturer can develop the control of the total facility with very little effort.

For the communication with other modules the module comprises an external interface of the control. The external interface furthermore comprises an administration shell that publishes at least one service relating to an output product of the respective module via a network. The administration shell, thus, publishes which service or which services the respective module can execute regarding an output product. For example, if the module executes the heating of a product the administration shell will publish the service "heating" and, as the case may be, the output product that can be obtained with it if applicable by describing properties of the output product.

Furthermore, the external interface is adapted to request at least one service relating to a input product of the corresponding module via the network. In case, for example, the module requires a defined certain amount of an input product it will call for a service "metering" of the respective input product.

In this manner, the modules are able to communicate with each other autonomously via their administration shells and offer or call for services one another. Thereby, the modules are able to establish a technical process by themselves without the need that a process management level or a facility designer has to assemble the modules manually. This kind of automatic PFE-engineering from module to module without that a higher-ranked entity, in particular a higher-ranked process management level, is present, is also more free from defects because each of the participating modules precisely knows its individual availabilities, the desired condition of the input materials, boundary conditions, auxiliary materials, maintenance schedules, limitations etc. and can offer its services correspondingly. By this interaction and the communication of the modules via their administration shells a potential technical process or several alternative technical processes establish automatically that will lead to an end-product. In case several alternative technical processes are obtained the best process may be selected.

Preferably, in the administration shell the at least one service relating to the output product of the module is published by means of standardized meta-information via the network. Thereby, preferably, the standardized meta-information is continuously kept up-to-date by the control. The application of standardized meta-information facilitates the search for the respective service.

Preferably, the external interface is adapted to request the service relating to the input product by means of standardized meta-information relating to the input product via the network.

Preferably, the module comprises a state machine. By means of a state machine the corresponding module knows exactly its actual state and the necessary transitions to obtain a different target state.

Preferably, at least one state of the state machine is published in the administration shell, and the state of the state machine is dependent on a response to the request for a service relating to the input product of the module. In particular, the service relating to to the input product of the module can be a provisioning of the input product. In case, for example, all needed input products of a module can be provided the module can start the handling or processing of these input products and thereby change its state into "in operation".

Preferably, the module is adapted for processing the input product and for the output of the output product, and/or for measuring a physical quantity of the input product and/or of the output product, and/or for physically storing the input product and/or the output product. The module can be of different kind and can execute different tasks or offer different services, respectively, that relate to an input product or output product of the module. In particular a module can be suitable for processing, outputting, measuring or storing.

Preferably, the technical hardware is developed to produce the output product from the input product, and the technical hardware is furthermore developed to produce the output product by modifying the input product by change of a chemical composition, and/or change of at least one physical property, and/or adding of material, and/or clearing of material. The technical hardware has, preferably, one input product and one output product and it changes the input product such that an output product is produced. A product is defined by the fact that it can be changed by at least one of the four mentioned processes by the technical hardware. Because of the change of the input product to the output product by the technical hardware a creation of value is achieved. Thus, the total process comprises at least one technical hardware of this kind that can achieve a creation of value. Preferably, the technical hardware comprises an actuator that acts on the input product.

Preferably, the administration shell comprises static information about the technical hardware and its functional range and dynamic information as real-time values of the technical hardware and their functional capability, wherein the real-time values are generated by the control.

Hereby, the statistic information describe the technical hardware and the control such that all information can be provided that is necessary for the PPE-engineering. These information can comprise, for example, a detailed description of the services offered by the module, a description of the available states and the control-related behavior of the module, a description of the available commands and their syntax and a description of the state information and measuring values that can be read-out.

Besides, the administration shell comprises also dynamic information as real-time values of the technical hardware. and, thus, offers the possibility of a communication with the module during operation. These real-time values of the technical hardware are written by the control into the administration shell, in particular into an information structure on an OPC-UA server. Thereby, also these real-time values that dynamically change during operation are easily and target-oriented extraneous retrievable, for example by other modules or the request module.

Preferably, the control generates the real-time values from measurement data and/or control data of the technical hardware, and/or communication data transmitted via the external interface, and/or states of the state machine to the service provided by the control and the technical hardware, and/or historical values of measurement data and/or control data of the technical hardware and/or of states of the state machine, and/or an extrapolation of measurement data and/or control data of the technical hardware and/or communication data and/or of states of the state machine.

Preferably, the external interface comprises an OPC-UA server that comprises a definite specified information structure into which the administration shell is mapped. Because the external interface of the control comprises an OPC-UA server it is possible to communicate with the module in an easy and unified manner. In particular, individual information can, thus, he requested target-oriented from the module, wherein non-related information is not transmitted. In particular, the OPC-UA server comprises to this end a definite specified information structure that comprises static and dynamic information relating to the technical hardware of the module. Thus, target-oriented requests can be directed to the module for information of interest.

Preferably, the administration shell maps information in the structure of a module type package, and thus comprises in a structured form all information that is necessary for the integration of the module into a technical facility.

By means of the static and dynamic information that are provided in the administration shell, the module can provide a complete module type package which forms a part of the administration shell in industry 4.0 and that comprises all data and information for a virtual and functional representation of the module. Thereby, all data and information for the automatic PFE-engineering from module to module as well as for the ongoing operation are provided by the control in the administration shell.

The problem above is furthermore solved by a system for the execution of a process by means of a technical facility comprising a plurality of modules as described above and which can execute sub-processes of the technical process, a request module, comprising an external interface with an administration shell, and a network which connects the modules and the request module with each other, wherein the request module can request a service for an end-product at the modules via the network. The request module can communicate with the, in particular with all, technical modules via the network and can direct a request to them for an end-product. This request can be received by a module that provides the end-product as an output product. This module asks then on his part the other modules to provide its required input products in the desired amount, at the desired time and in the desired condition. In case corresponding modules answer thereupon, they will in turn request other modules for their required input products. Thus, bit by bit a technical process is establishing that leads to the end-product requested by the request module by means of the corresponding modules. The starting point of such a process is in general a module that stores an input product of another module and provides the input product to this module.

Preferably, the request module comprises an own state machine, wherein in a first state of the state machine the request module requests a service for an end-product at the modules via the network, a first module, that offers the service for the end-product, requests at least one service for its input product at the other modules via the network, a second module, that offers the at least one service for the input product of the first module as an output product, requests at least one service for its input product at the modules via the network, and the request module receives a message that the process is complete from one of the modules, and wherein the state machine of the request module transitions into a second state when the process is complete, wherein in the second state the process can be started. The actual production process is started by the request module when one or more modules signal to it that the process is complete, thus, the end-product can be produced.

Preferably, the request module comprises an administration shell and offers in the administration shell at least one service that contains the end-product. The request module can offer at least one service by itself that comprises the end-product, for example the service "providing the end-product" that can be requested, for example, by a downstream packaging module.

Preferably, a module generates the message of completeness, when each of its input products, necessary for the process, is provided with the state "available" at its administration shell, and wherein the message of completeness is transmitted from the generating module to the request module. In particular, the message of completeness is transmitted to the request module when the module that has the end-product as an output product realizes that all its necessary input products are available. Then the technical process is completely established and ready for the actual production.

Preferably, the request module comprises a processing unit that is adapted to carry out an evaluation of the planned process, wherein the evaluation result is a prerequisite for the transition from the first state of the state machine to the second state of the state machine. The request module can evaluate the process that is established and suggested by the technical modules according to its criteria by means of a processing unit. Not until the evaluation turns out positive the request module starts the production. This is advantageous, in particular, when several alternative processes lead to the end-product. The request module can then decide for the technical process that is best according to the evaluation. The evaluation can be done with regard to different criteria, for example, with regard to process duration, reliability of the modules, quality, the energy consumption etc.

Preferably, the processing unit of the request module is adapted to carry out the evaluation by means of an optimum calculation based on the technical complexity. Thereby, the technically best process can be selected.

The problem mentioned above is furthermore solved by a method for the execution of a technical process by means of a technical facility, comprising a plurality of modules, at least one request module and a network, wherein the modules comprise a technical hardware for the execution of a technical sub-process and a control for the local control of the technical hardware, wherein the control comprises an external interface that includes an administration shell, wherein the method comprises the following steps of:

a. publishing at least one service that is related to an output product of the respective module via the network by the administration shell of each module;
b. requesting at least one service that is related to an input product of the respective module via the network by the external interface of each module;
c. requesting at least one service for an end-product via the network by the request module;
d. receiving a message that the. process is complete from one of the modules by the request module.

Also, hereby, an automatic establishment of a technical process for the production of an end-product takes place by an autonomous communication of the modules among each other. Starting point is a request for at least one service for an end-product by the request module via the network. This then receives, when the process is completely established, a corresponding message. Preferably, each module only then requests, if it was requested itself.

Preferably, the method is further comprising the following steps of:

e. carrying out an evaluation of the planned technical process by a processing unit of the request module; and
f. starting the process in due consideration of the evaluation result.

After the reception of the message that the process is complete the request module can evaluate the process, as the case may be select the best alternative, and start the process.

Further preferred embodiments of the invention arise from the dependent claims.

4. SHORT DESCRIPTION OF THE FIGURES

In the following, preferred embodiments of the present invention are described by reference to the figures, in which shows.

5. Description of preferred embodiments

In the following preferred embodiments of the present invention are described in detail with reference to the figures.

Figure 1:
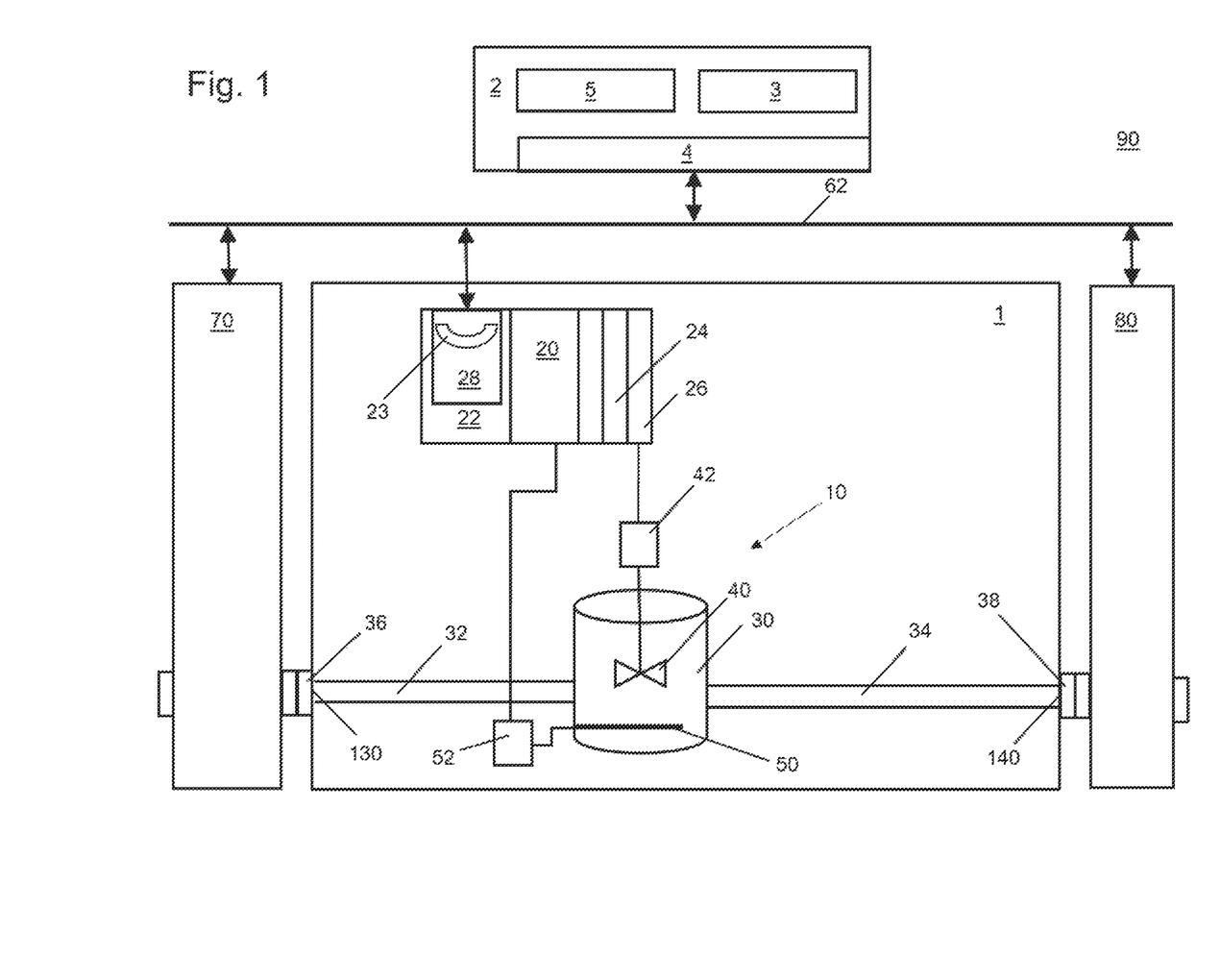
FIG. 1 a schematic view of a technical facility with several modules and a request module.

FIG. 1 shows a technical facility 90 that is assembled from several single modules 1, 70, 80 and potentially further modules not shown. The technical facility 90 further comprises a request module 2 which, among other things, is responsible for a placing of orders to the technical facility 90. The request module 2 and the modules 1, 70, 80 can communicate with each other via an appropriate bus 62.

The module 1 of the technical facility 90 is an example for all modules 1, 70, 80 of the technical facility 90. It comprises a technical hardware 10 for the execution of a technical sub-process, for example for the chemical industry. The technical facility can, however, also relate to other technical manufacturing processes, for example the production and assembling of products, packaging technology, logistics, etc.

Preferably, the technical hardware 10 of the module 1 is developed to produce an output product 140 from an input product 130. For this, the technical hardware 10 is further developed to change the input product 130 for the production of the output product 140. This can be done by a change of a chemical composition, as it is common for example in reactors of the chemical industry. This can furthermore be done by a change of at least one physical property, for example the temperature, density, entropy etc. Furthermore, the production of an output product 140 can be done by adding material, for example in mounting, soldering, imprinting or 3D-printing. The production can finally be done by clearing of material as it is for example the case in drilling, milling, etching etc.

By the change of the input product 130 to the output product 140 by the technical hardware 10 a creation of value is achieved. Thus, the total process comprises at least one technical hardware 10 of this kind that achieves a creation of value. Preferably, the technical hardware comprises at least one actuator in its broadest sense that acts on the input product 130, for example an evaporation device.

In the illustrated process-related example the technical hardware 10 comprises an actuator in terms of a reactor 30 that comprises a mixing machine 40 which is driven by an electric motor 42. Furthermore, the reactor 30 comprises an electric heating rod 50 that is controlled by a power electronic 52. The reactor 30 itself comprises a preferably closed vessel at which an inlet pipe 32 and an outlet pipe 34 are attached in order to fill or empty it. The inlet pipe 32 extends up to the outer boundary of the exemplary module 1 and ends there in an inlet flange 36. Likewise, the outlet pipe 34 extends up to the system boundary of the module and ends there in an outlet flange 38. The module 1 is connectable to an upstream module 70 via the inlet flange 36 and connectable to a downstream module So via the outlet flange 38. Of course other technical connection possibilities are also equally possible as for example several inlets or several outlets or parallel connections of modules 1, 70, 80, respectively.

The module 1 further comprises a control 20 for the local control of its technical hardware 10. The control 20 is adapted such that it can control the technical hardware 10, thus, here as an example the electric motor 42 of the mixing machine 40 and the power electronic 52 of the heating rod 50, autarkical. Thereby, the control 20 is able for example to bring the module 1 technically into a defined state. The module 1 can comprise a number of precisely defined technical states and can switch autarkical between these states. Thereby, the module can for example execute a technical sub-process autarkical without any extraneous influence.

The module 1 can furthermore comprise for example sensors, like flow rate, pressure or temperature sensors or electrically controllable valves or similar elements (not shown). Such sensors or actuators are likewise connected to the control 20 and can be requested or controlled by the control 20.

For this, the control 20 comprises I/O modules 24, 26 with which the control 20 can activate actuators like the electric motor 42 of the mixing machine 40 or the power electronic 52 of the heating rod 50, respectively. Further I/O modules for possible sensors or further actuators are available if they are necessary for the technical functioning of the module 1.

The modules 70, 80 and further modules can be arranged similar to the module 1, wherein they also comprise a control similar to the control 20 which can control the technical hardware of the corresponding module locally and autarkical. Accordingly, the modules 1, 70, 80 are control-related autarkical in itself such that technical hardware and control together form a flexible applicable module for a technical facility 90 which can be arranged technically and control-related, as it were by "plug and play", to a total facility 90.

For the communication of the control 20 of the module 1 with the request module 2 or the other modules 70, 80 via the bus 62 the control 20 comprises an external interface 22. The external interface 22 comprises an administration shell 23 that is mapped into an OPC-UA server 28 for the communication with the request module 2 and the other modules 70, 80 of the facility 90. The OPC-UA server 28 comprises to this end a definite specified information structure into which the administration shell 23 is mapped. The administration shell 23 can comprise static information and dynamic information. The static information describes the technical hardware 10 and the control 20. The static information can comprise for example descriptions of the services offered by module 1, specifications of the input products 130, specifications of the output products 140, information about production auxiliary means like power, water etc., user documentations, interface definitions with a corresponding description of the syntax of the commands, information for a direct communication start from the process management level to the module 1, a graphical representation of the module 1 etc.

In addition to the static information the information structure of the OPC-UA server also comprises dynamic information relating to the module 1 that can temporally change. Thereby, the module 1 can communicate with other facility units via the OPC-UA server also during ongoing operation and provide dynamic information or exchange, respectively. The dynamic information is written as real-time values of the technical hardware 10 into the information structure of the OPC-UA server by the control 20.

By means of the static and dynamic information that are provided in the OPC-UA server the module 1 can map the information in the structure of a complete so called "module type package (MTP)" in its administration shell 23 that forms a part of the administration shell in industry 4.0 and that comprises all data and information for the virtual and functional representation of a module.

In particular, the administration shell 23 of the modules 1, 70, 80 publishes at least one service relating to an output product 140 of the corresponding module 1 via the network 62. Furthermore, the external interface 22 is adapted to request at least one service relating to an input product 130 of the corresponding module 1 via the network 62 and to receive corresponding responses of other modules 1, 70, 80.

The request module 2 also comprises an administration shell 4 for the communication with the modules 1, 70, 80 as well as an own state machine 3 for the generation and representation of defined states.

Figure 2:
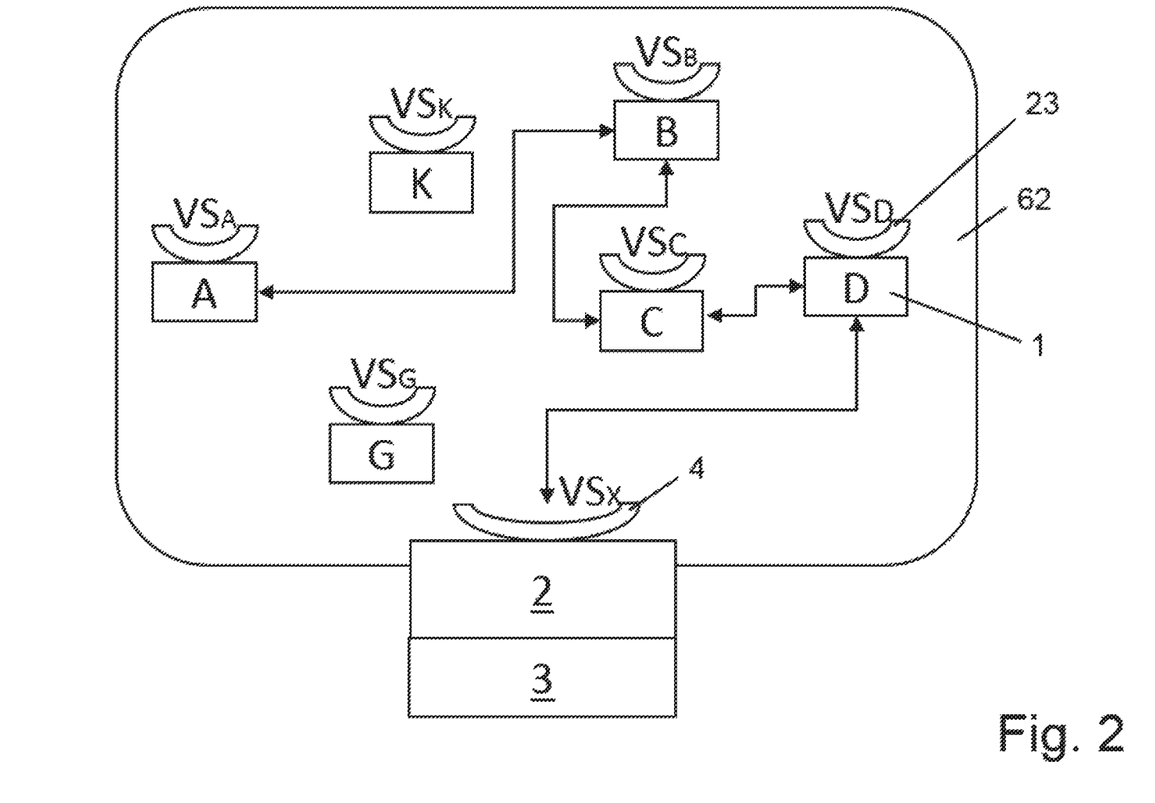
FIG. 2 a scheme that shows a request module and the communication and the establishment of a technical process by the modules of a technical facility.

As it is shown in FIG. 2, a request module 2 can communicate with a number of modules 1 that are designated with A, B, C, D, G and K via a network 62 that is illustrated as an area. In order to start the PFE-engineering the request module 2 merely needs to send a request for a desired end-product to the modules 1. Provided that one of the modules 1, here module D, can provide such end-product it sends on his side a request to the other modules A, B, C, K and G for the services required therefore relating to the input product of the module D. In the illustrated case the module C can provide the service or the input product required by module D to module D. Thereupon, also module C sends a request to the other modules A, B, D, K and G for the service necessary therefore relating to the input product of the module C. This service can provide the module B in the example of FIG. 2. The services required by the module B provides the module A in the example of FIG. 2. The module A is a module that stores the input product of the module B and, thus, does not require an input product itself. The technical process is thereby complete which is communicated from one of the modules A, B, C, D to the request module 2.

Figure 3:
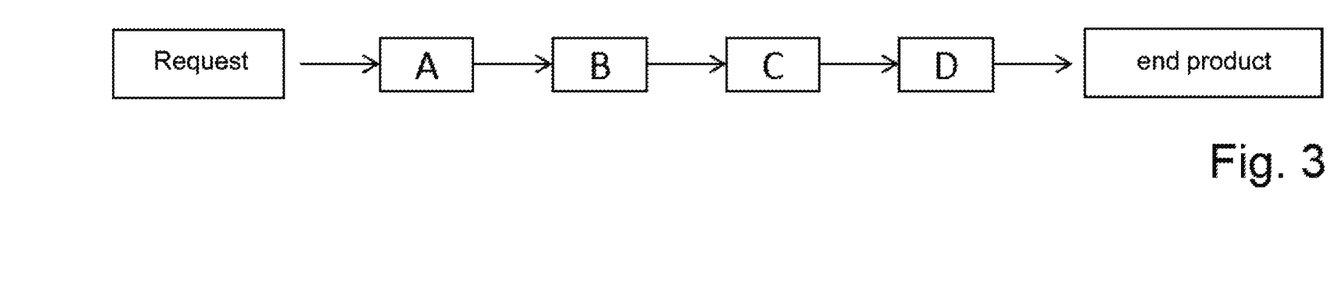
FIG. 3 a diagram that shows exemplary process steps of a technical process.

Accordingly, a technical process is forming itself in this automatic PFE-engineering by the participating modules 1 as it is illustrated by way of example in FIG. 3. A higher-ranked process management level, in particular a higher-ranked facility control, is hereby not necessary.

Figure 4:
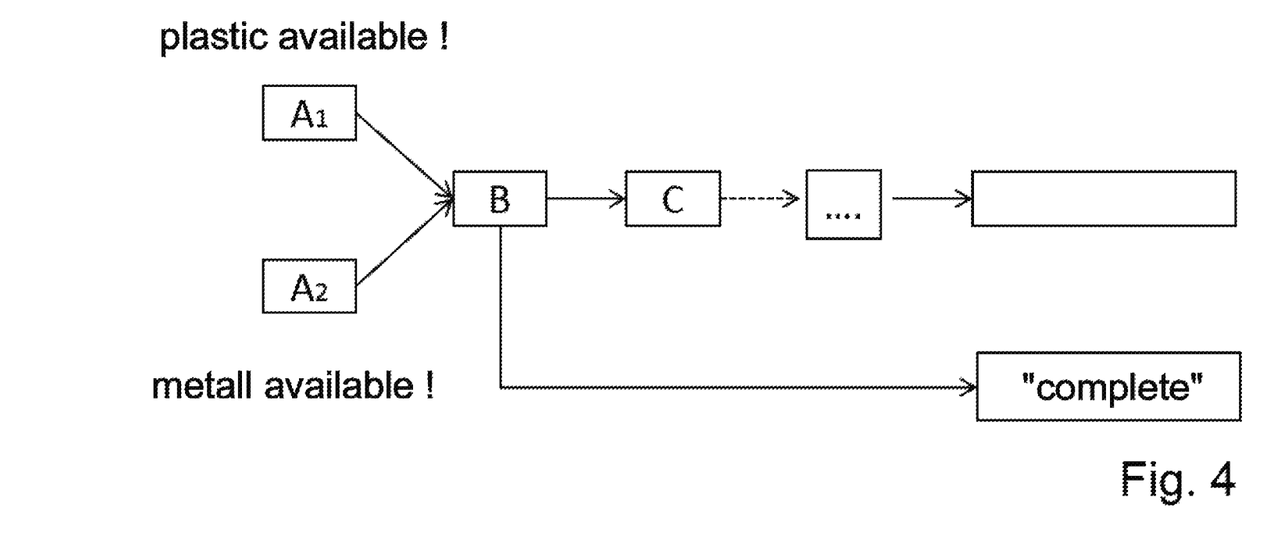
FIG. 4 a diagram that by way of example shows the interaction of different modules of a technical facility.

In FIG. 4 a different technical process is illustrated in which the module B requires two input products or corresponding services. In the example of FIG. 4 the module B requires plastic from the module A1 and metal from the module A2. In case both, the module A1 informs the module B that plastic is available and the module A2 informs that metal is available, the module B can inform the request module 2 that the process is complete. The request module 2 can thereupon evaluate the process and, as the case may be, start the actual production.

Figure 5:
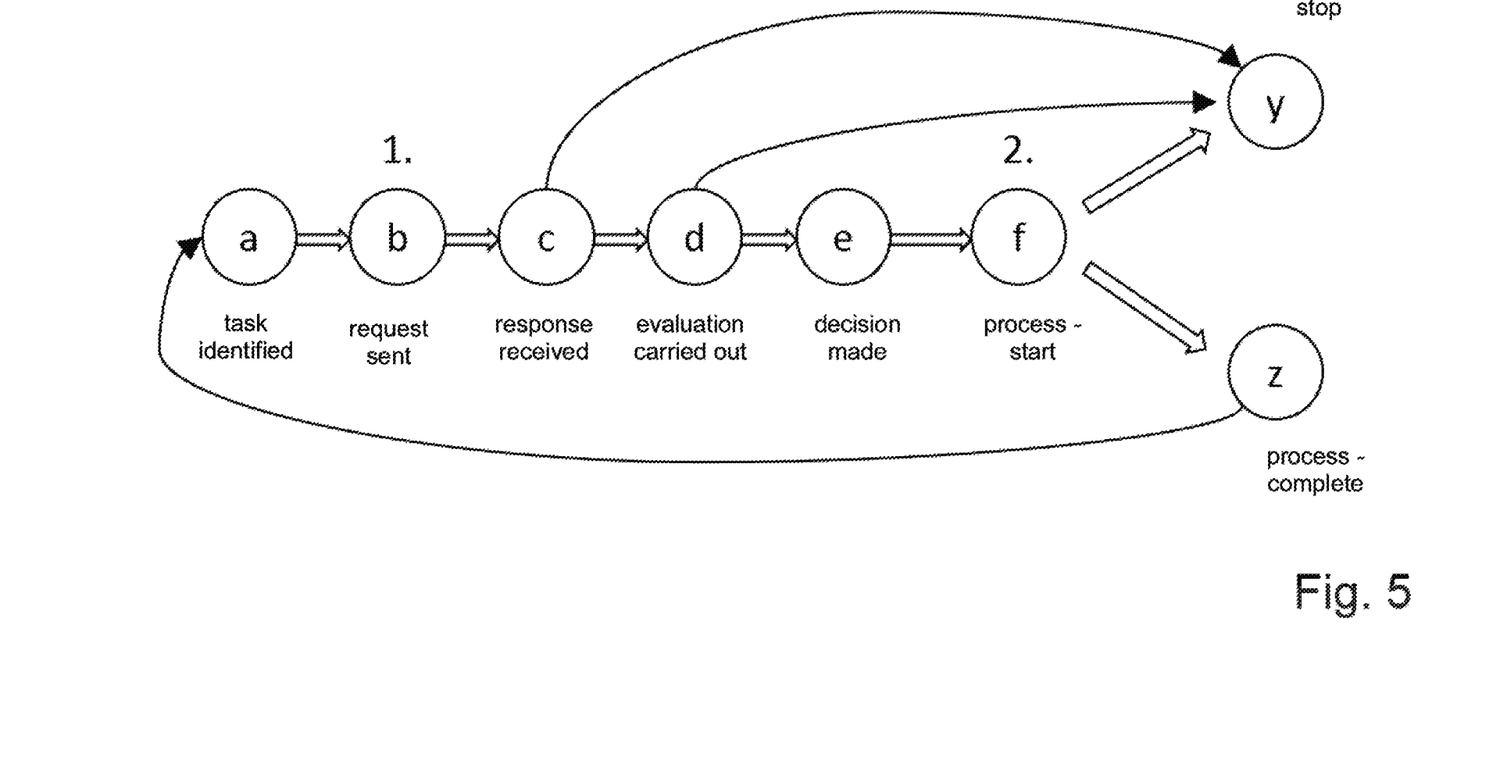
FIG. 5 a diagram that illustrates exemplary states of a request module.

An exemplary state diagram of a state machine of a request module 2 is illustrated in FIG. 5. In the state a, the request module has identified the task, for example the task "produce 1000 connectors of the type X". Thereupon, the request module requests the modules 1 of the network 62 for a service that can provide 1000 connectors of the type X. After that the state of the request module 2 transitions to the state b which corresponds to the first state mentioned above. As soon as the request module 2 has received the message "process complete" from one of the modules it transitions to the state c. Thereupon, the request module 2 evaluates the offered process by means of its processing unit. As soon as this is done, it transitions to the state d. After that the request module 2 comes to a decision whether, and as the case may be, which technical process is to be executed. When this is done the request module transitions to the state e. After that the request module 2 starts the production process and transitions to the state f. In case the production succeeded the request module 2 transitions to the state z. If, however, the production failed it transitions to the state y. The request module 2 can also take up this state, for example, if it has received a negative response from the modules 1 or if the evaluation of the suggested process turned out negative. When the process is completed the request module 2 can again accept and identify a new task.

The control 20 can generate the real-time values that are written into the information structure of the OPC-UA server 28 from measurement data, control data and communication data transmitted via the external interface 22 of the technical hardware 10. Thereby, parameters as for example measurement data, control parameter or default values etc. can be provided to the technical hardware 10 for recall or for communication. In the example of the module 1 the real-time values could be for example the rotational speed of the motor 42 or the actual temperature of the reactor 30.

In addition to that the control 20 can generate the real-time values from states of the state machine of the service provided by the control 20 and the technical hardware 10. Thereby, in a state machine of the corresponding module 1 the states of the technical hardware 10, as for example "in operation", "stopped", "under maintenance", "out of order", "heating" or the task schedule, the occupancy times, the maintenance schedule etc. can be provided to the technical hardware 10 or for recall or for communication, respectively. In the example of the module 1 the real-time values could be for example the states "mixing" and "heating" or the availability or non-availability, respectively, of a certain service. For example, if the heating rod 50 has to be exchanged but the mixing machine 40 is available at the same time.

Furthermore, the control 20 can generate the real-time values also from historical data of measurement data, control data and communication data transmitted via the external interface 22 of the technical hardware 10 or from states of the service provided by the control 20 and the technical hardware 10. Thereby, real-time values can be provided for recall or for communication, respectively, that consider the past or history or that are calculated from historical values. For example, the next maintenance due date of the technical hardware 10 could be calculated and provided dynamically with regard to an actual load and past periods at different load levels or the number of critical states of the technical hardware 10 by the control 20. If for example the mixing machine 40 can be operated by the motor 42 with different rotational speeds and power values the duration of the availability of the module 1 can depend on the rotational speeds and the power values of past tasks. As the case may be the motor 42 has to be operated in the actual task by a reduced power or rotational speed in order to cool down.

In addition, the control 20 can generate the real-time values by extrapolation of measurement data, control data and communication data transmitted via the external interface 22 of the technical hardware 10 or of states of the service prodded by the control 20 and the technical hardware 10. The control can furthermore calculate and provide real-time values that are extrapolated into the future. For example, the control can calculate and provide temperature curves, necessary maintenance and pause times at current load, necessary future cool-down phases, free time slots, potential limitations of a maximum rotational speed etc. For the extrapolation the control 20 can use different models. Thereby, after finishing a task, the control 20 can offer a service only with certain boundary conditions. For example, if the motor 42 is still heated, a mixing of a product in the reactor 30 only up to a certain power or up to a certain rotational speed of the motor 42, respectively, or only for a limited period.

LIST OF REFERENCE SIGNS

1 Module
2 request module
3 state machine
4 administration shell
10 technical hardware
20 control
22 external interface
23 administration shell
24, 26 I/O module
28 OPC-UA server
30 reactor
32 inlet pipe
34 outlet pipe
36 inlet flange
38 outlet flange
40 mixing machine
42 motor
50 heating rod
52 power electronic
62 data bus 70, 80 further modules
90 technical facility
130 input product
140 output product

The invention claimed is:
1. A system for the execution of a process by means of a technical facility comprising:
 a. a plurality of modules comprising:
  i. a technical hardware for the execution of a technical sub-process;
  ii. a control for a local control of the technical hardware, wherein the control is adapted to control the technical hardware independently; and
  iii. an external interface of the control; wherein the external interface comprises an administration shell, wherein the administration shell publishes at least one service relating to an output product of the module via a network; and
  iv. wherein the external interface is adapted to request at least one service relating to an input product of the module via the network;
  wherein the plurality of modules can execute sub-processes of the technical process;
 b. a request module, comprising: an external interface including its own administration shell; and
 c. a network which connects the plurality of modules and the request module with each other; wherein:
 d. the request module can request a service for an end-product at the modules via the network;
wherein the request module further comprises an own state machine;
wherein in a first state of the own state machine:
 I. the request module requests a service for an end-product at the modules via the network;
 II. a first module, that offers the service for the end-product, requests at least one service for its input product at the other modules via the network;
 III. a second module, that offers the at least one service for the input product of the first module as an output product, requests at least one service for its input product at the modules via the network; and
 IV: the request module receives a message that the process is complete from one of the modules; and
 wherein the own state machine of the request module transitions into a second state when the process is complete, wherein in the second state the process can be started.
2. The system according to claim 1, wherein in the administration shell the at least one service relating to an output product of the module is published by means of standardized meta-information via the network.
3. The system according to claim 1, wherein the external interface is adapted to request the service relating to the input product by means of standardized meta-information relating to the input product via the network.
4. The system according to claim 1, further comprising a state machine.
5. The system according to claim 4, wherein at least one state of the state machine is published in the administration shell and wherein the state of the state machine is dependent on a response to the request for a service relating to the input product of the module.
6. The system according to claim 1, wherein each of the plurality of modules is adapted to:
 a. for processing the input product and for the output of the output product; and/or
 b. for measuring a physical quantity of the input product and/or of the output product; and/or
 c. for physically storing the input product and/or the output product.
7. The system according to claim 1, wherein the technical hardware is developed to produce the output product from the input product, and the technical hardware is furthermore developed to produce the output product by modifying the input product by,
 a. change of a chemical composition; and/or
 b. change of at least one physical property; and/or
 c. adding of material; and/or
 d. clearing of material.
8. The system according to claim 1, wherein the administration shell comprises static information about the technical hardware and dynamic information as real-time values of the technical hardware, wherein the real-time values are generated by the control.
9. The system according to claim 8, wherein the control of each of the plurality of modules generates the real time values from:
 a. measurement data and/or control data of the technical hardware; and/or
 b. communication data transmitted via the external interface; and/or
 c. states of the state machine to the service provided by the control and the technical hardware; and/or
 d. historical values of measurement data and/or control data of the technical hardware and/or of states of the state machine; and/or
 e. an extrapolation of measurement data and/or control data of the technical hardware and/or communication data and/or of states of the state machine.
10. The system according to claim 1, wherein the external interface comprises an OPC-UA server that comprises a definite specified information structure into which the administration shell is mapped.
11. The system according to claim 1, wherein the administration shell maps information in the structure of a module type package that comprises in a structured form all information that is necessary for the integration of the module into a technical facility.
12. The system according to claim 1, wherein the request module offers in its administration shell at least one service that contains the end-product.
13. The system according to claim 1, wherein a module generates the message of completeness, when each of its input products, necessary for the process, is provided with the state "available" at its administration shell, and wherein the message of completeness is transmitted from the generating module to the request module.
14. The system according to claim 1, wherein the request module comprises a processing unit that is adapted to carry out an evaluation of the planned process, wherein the evaluation result is a prerequisite for the transition from the first state of the state machine to the second state of the state machine.
15. The system according to claim 14, wherein the processing unit of the request module is adapted to carry out the evaluation by means of an optimum calculation based on the technical complexity.
16. A method for the execution of a technical process by means of a technical facility, comprising a plurality of modules, at least one request module and a network, wherein the modules comprise a technical hardware for the execution of a technical sub-process and a control for the local control of the technical hardware, wherein the control comprises an external interface that includes an administration shell, wherein the method comprises the following steps:
- a. publishing at least one service that is related to an output product of the respective module via the network by the administration shell of each module;
- b. requesting at least one service that is related to an input product of the respective module via the network by the external interface of each module;
- c. requesting at least one service for an end-product via the network by the request module;
- d. receiving a message that the process is complete from one of the modules by the request module.

17. The method according to claim 16, further comprising the following steps:
- e. carrying out an evaluation of the planned technical process by a processing unit of the request module; and
- f. starting the process in due consideration of the evaluation result.

\* \* \* \* \*